United States Patent
Kabrich et al.

(10) Patent No.: US 7,353,725 B2
(45) Date of Patent: Apr. 8, 2008

(54) METHOD OF SHIFTING GEARS IN A WORK MACHINE

(75) Inventors: Todd R. Kabrich, Creve Coeur, IL (US); Tom Brosowke, Peoria, IL (US); Vaibhav H. Shah, Peoria, IL (US); Andrew W. Sloan, Peoria, IL (US); Richard B. League, Peoria, IL (US); Brian E. Lister, Edwards, IL (US)

(73) Assignee: Caterpillar Inc., Peoria, IL (US)

( * ) Notice: Subject to any disclaimer, the term of this patent is extended or adjusted under 35 U.S.C. 154(b) by 181 days.

(21) Appl. No.: 11/269,947

(22) Filed: Nov. 9, 2005

(65) Prior Publication Data

US 2007/0101818 A1    May 10, 2007

(51) Int. Cl.
*F16H 59/00*    (2006.01)
(52) U.S. Cl. ............................................. 74/335
(58) Field of Classification Search ................ 74/335; 192/3.58, 3.63; 475/123, 125, 120
See application file for complete search history.

(56) References Cited

U.S. PATENT DOCUMENTS

| | | | |
|---|---|---|---|
| 4,836,057 A | 6/1989 | Asayama et al. | |
| 5,282,401 A | 2/1994 | Hebbale et al. | |
| 5,865,708 A | 2/1999 | Nishio et al. | |
| 6,149,548 A | 11/2000 | Holbrook et al. | |
| 6,328,674 B1 * | 12/2001 | Matsue et al. | 477/155 |
| 6,567,733 B2 | 5/2003 | Popp et al. | |
| 6,619,152 B2 | 9/2003 | Ochi et al. | |
| 7,043,347 B2 * | 5/2006 | Inoue et al. | 701/67 |
| 7,225,907 B2 * | 6/2007 | Katou et al. | 192/3.26 |

FOREIGN PATENT DOCUMENTS

| | | |
|---|---|---|
| DE | 43 20 858 | 1/1994 |
| EP | 0435373 | 7/1991 |
| EP | 0833083 | 4/1998 |
| EP | 1188968 | 3/2002 |

* cited by examiner

*Primary Examiner*—Dirk Wright
(74) *Attorney, Agent, or Firm*—Liell & McNeil (57) ABSTRACT

A method of shifting gears in a work machine includes modulating an oncoming clutch pressure via a first segment of a predetermined curve, and modulating the clutch pressure via a second segment of the predetermined curve after the occurrence of a predetermined relative velocity state of a work machine transmission. A work machine having an electronic controller with an embedded shifting control algorithm that includes means for modulating the oncoming clutch pressure via a first segment of a predetermined curve, and via a second segment of a predetermined curve having a net slope different from the first segment after the occurrence of a predetermined relative velocity state of the work machine transmission.

20 Claims, 3 Drawing Sheets

METHOD OF SHIFTING GEARS IN A WORK MACHINE

TECHNICAL FIELD

The present disclosure relates generally to methods of shifting gears in a work machine, and relates more particularly to such a method including modulating an oncoming clutch pressure versus time via a first segment of a predetermined clutch pressure curve having a slope and, after the occurrence of a predetermined transmission ratio, modulating the oncoming clutch pressure via a second segment of the predetermined curve having a different slope.

BACKGROUND

Virtually all on-highway and off-highway work machines have automatic or manual transmissions with multiple gears. In general terms, gear shifting takes place through disengagement of one clutch, an "offgoing" clutch, coupled with a first gear and close in time engagement of a second clutch, or "oncoming" clutch coupled with a second, higher or lower gear. During shifting, engagement and locking or "ring-in" of the oncoming clutch will often cause a temporary disruption in the output torque of the work machine transmission, in turn changing the rim pull of the work machine wheels and briefly accelerating or decelerating the work machine. Where the oncoming clutch pressure is increased too quickly, for example, a series of surges in output torque as the oncoming clutch alternately locks, then slips, as it settles toward ring-in can make operation uncomfortable for the operator. This phenomenon can also risk jarring or spilling loads carried by the work machine, or unduly stressing various work machine components. Moreover, it is well known that clutches and other transmission components may wear out more quickly than intended where the transmission is subjected to rough shifting. The particularly rough shifting experienced by novice operators is a familiar result of overly rapid clutch pressure increases. Where clutch pressure increases too slowly, excessive clutch slip can occur, resulting in its own set of familiar problems. Many transmissions and shifting methodologies are directed toward providing an optimal profile for clutch pressure modulation.

Shifting "smoothness" can very generally be divided into two categories, acceleration and jerk. Excessive, uncomfortable shifting acceleration can result where the work machine increases or decreases in speed more rapidly than desired. Jerk represents a change in acceleration itself. Over many years of transmission design, engineers have developed numerous designs and shifting strategies to keep acceleration and jerk within tolerable levels. In some instances, however, improvements in shifting smoothness may increase the duration of the shift, reducing operating efficiency. Additionally, where shifting smoothness is achieved by prolonging the duration of the shift, the transmission clutches by definition may slip for longer periods of time, presenting the additional drawback of premature component wear and failure. One common approach is to ramp up oncoming clutch pressure during a shift toward a target pressure calculated to be sufficient to accommodate the torque through the transmission without slipping.

One known shifting method directed to improved shifting quality is discussed in U.S. Pat. No. 5,282,401 to Hebbale et al. Hebbale et al. describe an adaptive control method wherein deviations from certain shifting parameters are stored in a look-up table and subsequently used to determine adaptive corrective values in subsequent shifts, in particular deviations in torque phase attributable to variability in oncoming clutch fill time and/or return spring pressure. In Hebbale et al., oncoming clutch pressure is ramped up to a target pressure, the ramp period being selected as a function of the desired shift feel, the shift type and the clutch involved. The actual ramp rate is selected such that the target pressure will be reached at the end of the ramp period. Hebbale et al. is a relatively complex system, and suffers from certain of the problems associated with other known designs.

The present disclosure is directed to one or more of the problems or shortcomings set forth above.

SUMMARY OF THE INVENTION

In one aspect, the present disclosure provides a method of shifting gears in a transmission of a work machine. The method includes the step of, modulating an oncoming clutch pressure versus time during a requested shift via a first segment of a predetermined curve having at least two curve segments. The method further includes the step of determining a value indicative of a transmission input speed to output speed ratio. The method still further includes the step of modulating the oncoming clutch pressure versus time during the requested shift via a second segment of the predetermined curve, prior to oncoming clutch ring-in, and based at least in part on the determined value.

In another aspect, the present disclosure provides a work machine. The work machine includes a work machine body, and a transmission coupled with the work machine body and having at least two gears. The work machine further includes an electronic controller coupled with the transmission and operable to control an oncoming clutch pressure thereof. The electronic controller includes means for modulating an oncoming clutch pressure versus time via a first segment of a predetermined curve, and means for modulating the oncoming clutch pressure versus time via a second segment of the predetermined curve prior to oncoming, clutch ring-in, and after the occurrence of a predetermined relative velocity state of the transmission.

In still another aspect, the present disclosure provides an electronic controller including means for controlling oncoming clutch pressure prior to clutch ring-in during a gear shift in a work machine. The means for controlling includes means for modulating oncoming clutch pressure versus time via a first segment of a clutch pressure curve having a first net slope, and means for modulating the oncoming clutch pressure versus time via a second segment of the clutch pressure curve having a second, different net slope after the occurrence of predetermined transmission input speed to output speed ratio of the work machine.

DETAILED DESCRIPTION

Figure 1:
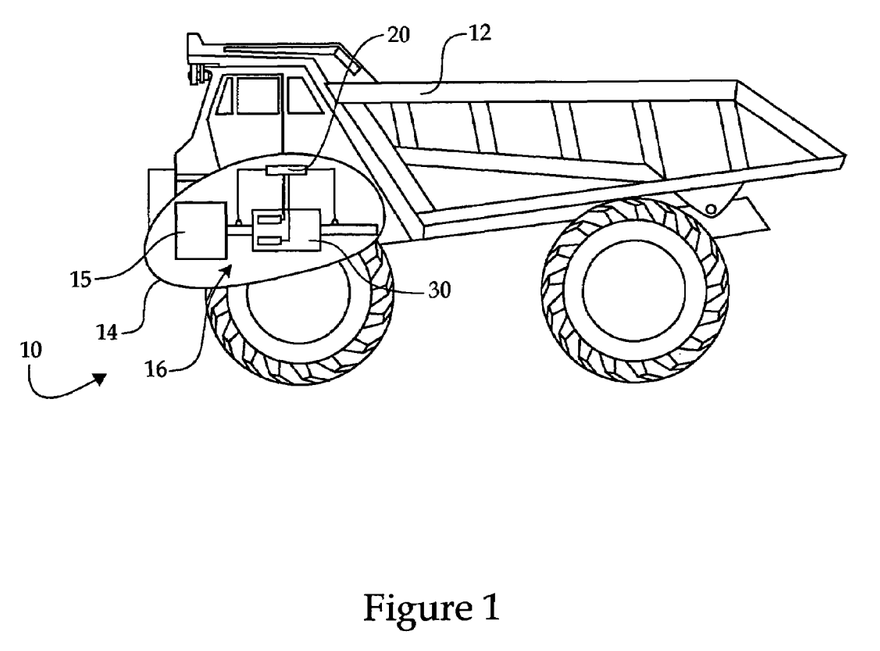
FIG. 1 illustrates a work machine according to the present disclosure.

Referring to FIG. 1, there is shown a work machine 10 according to the present disclosure including a work machine body 12. Work machine 10 comprises a drive system 14 inclusive of an engine 15, and a transmission system 16. An electronic controller 20 is provided for controlling various aspects of the operation of transmission system 16 as described herein. Work machine 10 is illustrated in the context of a large off-road dump truck, however, it should be appreciated that a wide variety of work machines could be constructed according to the present disclosure. In particular, work machine 10 may be, but is not limited to, a wide variety of multi-mass work machines. As used herein, the term "multi-mass" is intended to encompass such work machines as are typically subjected to wide swings in inertia due to presence or absence of large loads, for example, on and off-highway trucks, buses, etc. Other particular applications of the present disclosure may include transmission systems intended for use in different machines, themselves having different inherent inertia. For instance, the teachings of the present disclosure might be applied to a line of recreational vehicles of differing size and hence, mass, but each using similar transmission systems and operating methods.

Figure 2:
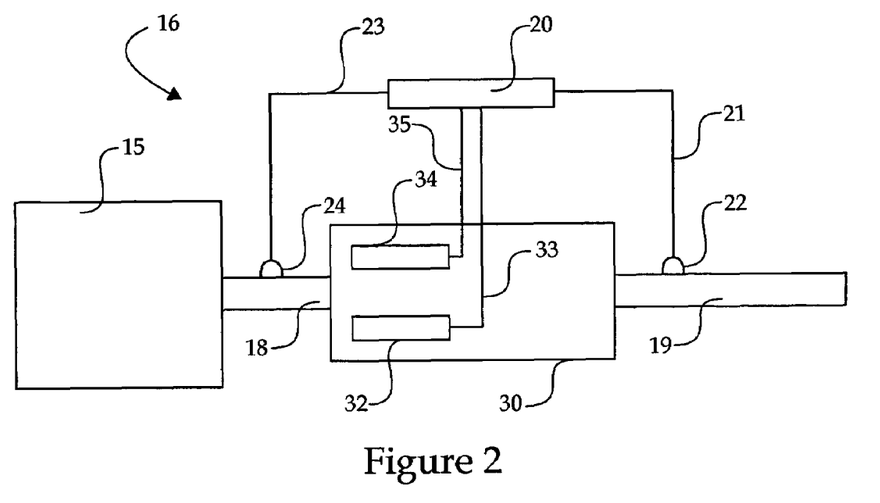
FIG. 2 schematically illustrates a portion of the work machine of FIG. 1.

Turning to FIG. 2, there is illustrated a schematic of a portion of work machine 10, including transmission system 16 shown coupled with engine 15. Transmission system 16 includes a transmission 30 with at least two gears, an input shaft 18 coupled with engine 15, and an output shaft 19 which may comprise, or be coupled with a drive shaft, and hence the wheels, of work machine 10. Transmission 30 further includes a first clutch 32 and a second clutch 34, each of which may comprise hydraulic clutch actuators (not shown) controllably coupled with electronic controller 20 via communication lines 33 and 35, respectively. Electronic controller 20 may further be coupled with an input shaft speed sensor 24 via another communication line 25, and coupled with an output shaft speed sensor 22 via yet another communication line 21.

The present disclosure further provides a method of shifting gears in transmission 30 of work machine 10. It is contemplated that the method of the present disclosure will be applicable to both upshifting and downshifting, and may be used to effect a shift between any two consecutive forward or reverse gears of a work machine. The method comprises the step of modulating an oncoming clutch pressure versus time during a requested shift via a first segment of a predetermined curve having at least two curve segments. The predetermined curve may be a linear curve whereby the oncoming clutch pressure is increased at a predetermined linear rate. In one contemplated embodiment, the predetermined linear rate of the first curve segment may be determined on the basis of a load condition of work machine 10. In particular, the load condition of work machine 10 may be determined in part by determining an engine broadcast torque. As described herein, the term "load condition" is intended to include an inertial state of work machine 10. In a basic embodiment, a determination between two inertial states, a loaded and an unloaded condition, may take place. In other words, in a loaded condition of work machine 10, oncoming clutch pressure may be modulated via a first linear curve segment defining a first rate. In an unloaded condition, oncoming clutch pressure may be modulated via a first linear curve segment defining a second, different rate. As will be apparent from the present description, however, embodiments are contemplated wherein the oncoming clutch pressure may be increased at the same rate regardless of load condition. In most embodiments, however, the top pressure or fuse pressure to which the oncoming clutch pressure is increased will vary based on load condition, although the actual fuse pressure need not be determined, as described herein. It should also be appreciated that a work machine may be considered "loaded" in more than one way, for example because it is actually carrying a load such as a full dump truck bed, or because it is towing or dragging an additional load, or moving up a steep slope.

By determining broadcast torque, for example, an assessment of relatively how hard engine 15 is operating to propel work machine 10 may be made. Where broadcast torque is relatively high, for instance, work machine 10 may be determined to be in a loaded condition. For relatively lower broadcast torque, it may be determined that work machine 10 is in an unloaded condition. Those skilled in the art will appreciate that a variety of means are available for determining torque, and the present disclosure should not thereby be limited to any particular strategy. Furthermore, a variety of means are well known for determining that a work machine is carrying a load, for example, via a displacement sensor coupled to struts or shocks of the work machine, or by comparing ground speed and output torque.

Returning to the predetermined linear rate of the first curve segment, where work machine 10 is loaded, the net slope of the selected first curve segment may be relatively steeper, providing for a relatively more rapid increase in oncoming clutch pressure. In contrast, where work machine 10 is unloaded, the net slope of the first curve segment may be relatively less steep. It is contemplated that use of a linear first curve segment will provide one practical implementation strategy, as such an approach will typically allow the transmission output torque to remain relatively constant through the shift. It should be appreciated, however, that a non-linear first curve segment might be implemented without departing from the scope of the present disclosure, for instance, where torque is being increased or decreased upon initiating the shift, as will often be the case since operators typically do not maintain an exactly constant torque as determined by a throttle position.

The term "net slope" should be understood to mean that the relative rate of change in clutch pressure between initiating the increase in oncoming clutch pressure during a shift, and concluding the increase in clutch pressure, has a particular net value. In other words, even where the rate of increase is not constant, or even decreases, the first curve segment may still be characterized as having a particular net slope. It should further be appreciated that while different net slopes of the first curve segment could be implemented for loaded versus unloaded conditions of work machine 10, the present disclosure is not thereby limited to such a strategy. As further described herein, the first curve segment might always have the same or a similar slope.

The use of a first curve segment having a linear slope has been found to further ameliorate excessive accelerations/decelerations and jerk. Jerk may be understood as a change in acceleration/deceleration of the work machine. In one contemplated embodiment, during shifting work machine 10 will typically experience jerk levels of less than about 1.5 g/s, and in still other embodiments, work machine 10 will experience jerk levels of less than about 0.5 g/s. The present disclosure is by no means limited to these jerk levels, however, such limits appear to represent acceptable or superior shift quality as experienced by most operators. It should further be appreciated that actual jerk levels may vary based on operator requests or expectations. There may be some increase in shift duration where acceleration and jerk levels are minimal and, accordingly, certain operators may be willing to tolerate relatively greater jerk levels and/or peak accelerations in exchange for relatively more rapid shifts.

As described above, the first curve segment of the predetermined curve may have a net slope based on engine broadcast torque. In one contemplated embodiment, electronic controller 20 may reference at least one map having an engine broadcast torque coordinate in determining the appropriate net slope for the first curve segment. It should be appreciated, however, that rather than increasing the oncoming clutch pressure via a mapped curve segment, torque could be continuously or repeatedly calculated as the shift progresses. In other words, rather than determining a single first curve segment upon detecting a shift, and modulating the oncoming clutch pressure solely via that curve segment, the step of modulating the oncoming clutch pressure could be broken down into a plurality of discrete steps, calculating torque at each step increment and calculating/selecting an appropriate curve segment.

The method further includes the step of determining a value indicative of a transmission input speed to output speed ratio. As used herein the term "value indicative of" should be understood to include values derived by actually measuring input speed and output speed, as well as values indirectly indicating the parameters of interest, as described herein.

The method further comprises the step of, modulating the oncoming clutch pressure versus time during the requested shift via a second segment of the predetermined curve, prior to oncoming clutch ring-in and based at least in part on the determined value indicative of the transmission input speed to output speed ratio. In one embodiment, modulation may be transitioned from the first curve segment to the second curve segment after the occurrence of a predetermined relative velocity state of transmission 30, which may be an input speed to output speed ratio.

Typically, although not necessarily, the second segment of the predetermined curve will comprise a flat segment, or at least a portion of the second segment will include a net slope of about zero. The second segment will typically comprise a relatively smaller net slope than a net slope of the first segment. Embodiments are contemplated, however, where the second segment, or "fuse segment" has a varying slope to account for operator-induced changes in torque. In certain instances, the net slope of the second segment might be larger than the net slope of the first segment.

The point at which oncoming clutch pressure modulation via the first curve segment transitions to modulation via the second curve segment may represent a point corresponding to at which a "fuse" pressure of the oncoming clutch has been reached. The oncoming clutch fuse pressure may be understood as a clutch pressure sufficient to enable clutch ring-in. In other words, the fuse pressure represents a condition at which the oncoming clutch has sufficient capacity to accommodate the torque through the transmission. Thus, the actual clutch pressure will typically be increased via the first segment up to at least a minimum fuse pressure for a given load condition.

It will be recalled that shifting via the present disclosure does not necessarily involve actually determining/monitoring clutch pressure, however, so the actual clutch pressure may be unknown to the operator or controller, in contrast to certain earlier designs wherein actual clutch pressure determination was necessary during shifting. Because there will be some natural slippage of the oncoming clutch as it engages, the oncoming clutch pressure will typically reach the fuse pressure at a point in time prior to clutch ring-in. The occurrence of the predetermined relative velocity state may be used as an indirect indication that the clutch fuse pressure has been reached.

Use of the term "relative velocity state" should not be understood to limit the present disclosure to actually determining relative velocities of transmission components, as other factors may be measured, as described herein. In all instances, however, the factors measured may be used to indicate, directly or indirectly, the occurrence of a predetermined relative velocity state of transmission 30, for instance a transmission input to output speed ratio.

As described, the occurrence of the predetermined relative velocity state may be a predetermined transmission ratio, in other words a ratio between the transmission input speed and the transmission output speed, or a predetermined relative velocity between any two other components of the drive train which is indicative of the predetermined transmission ratio. Those skilled in the art will appreciate that there are many alternative ways of determining the occurrence of a predetermined relative velocity state. Clutch relative velocities, or axle, crankshaft, vehicle ground speed and other component velocities might be used to indicate directly or indirectly, the occurrence of the relative velocity state of interest. In most instances, however, relative velocities of at least two components will be used.

During a shift event, electronic controller 20 may monitor the transmission input and output speeds to determine when the predetermined ratio occurs. This approach has been found to provide a relatively reliable indication that the oncoming clutch has reached the fuse pressure, and modulation of the clutch pressure may be responsively switched from the first segment of the predetermined curve to the second segment. Transmission ratio serves as a suitable indicator of oncoming clutch pressure because, as the oncoming clutch is engaged, it will affect the rotation of transmission output shaft 19, such that it will gradually speed up or slow down relative to input shaft 18, depending in part on whether the shift event is an upshift or a downshift. Thus, as oncoming clutch pressure is increased via the first curve segment, a speed of transmission output shaft 19 relative to input shaft 18 will adjust toward the predetermined ratio indicative of a fuse pressure of the oncoming clutch.

In a typical embodiment, once the oncoming clutch reaches a fuse pressure, as indicated for instance by the occurrence of the predetermined transmission ratio, the clutch pressure will typically be at or close to a top pressure for the oncoming clutch. Different fuse pressures may exist for different loaded conditions of work machine 10. This is due to the fact that where the inertia of work machine 10 varies, the level of clutch pressure necessary to ring-in the oncoming clutch, and maintain clutch engagement without slipping out will also vary. A relatively higher work machine load condition will typically require a relatively higher fuse pressure, whereas a relatively lower work machine load condition will typically require a relatively lower fuse pressure. Thus, in an embodiment having only two load "conditions," i.e. loaded and unloaded, oncoming clutch pressure may be increased up to one of two fuse pressures, depending upon the determined load condition. In either case, however, the predetermined transmission ratio indicating indirectly that the clutch fuse pressure is reached, will typically be the same for a given work machine.

The transmission ratio that corresponds with a clutch fuse pressure may be determined empirically, for example. In one contemplated embodiment, one or more test machines may be operated through various gear shifting routines. Each time a shift is commanded, an operator or electronic controller will increase oncoming clutch pressure. Transmission ratio may be continuously monitored as clutch pressure is increased. Over a plurality of gear shifting tests, the increase in clutch pressure may be leveled off at various points corresponding to different transmission ratios. Shift quality factors such as duration, acceleration and jerk may be measured for each shifting test, and particular transmission ratios selected as target ratios that provide relatively high quality shifts, or shifts having particular characteristics, such as significant smoothness, or relatively short duration. In general, the relative velocity transmission state indicating the oncoming clutch has reached a fuse pressure will be developed individually for each work machine.

The selected relative velocity state, or input speed to output speed ratio, may provide a relatively rough adjustment means for shift quality/duration. In other words, the present shifting method might be executed via different transmission ratios per each machine, depending upon desired operating characteristics. It is contemplated that the range of suitable transmission ratios for triggering the transition between curve segments may be relatively narrow; hence the described relatively rough adjustment. Where different indicators of the occurrence of a predetermined relative velocity state are used, the relative effect on shifting may differ. Adjustments in the ramp rate or slope of the first predetermined curve segment may be used as a relatively finer adjustment of shifting characteristics.

Those skilled in the art should further appreciate that different work machines may have different transmission ratios that correspond to their respective fuse pressures. This is due at least in part to the fact that different transmissions may have different step changes between consecutive gears. For instance, in a first machine the first gear to second gear ratio may be 3:2, whereas in another work machine the first gear to second gear ratio may be 5:3. The separate work machines may thus have different transmission ratios that will correspond with an oncoming clutch fuse pressure, as the input/output ratios are inherently different.

One very general strategy for determining the transmission ratio indicative of fuse pressure in a given work machine may include first testing shift quality in a work machine where clutch pressure is increased linearly, for example, until a relatively large transmission input/output ratio is reached. At this point, oncoming clutch pressure may be held steady and an attempt made to complete the shift. If the shift is completed successfully, without undue acceleration or jerk, without slipping out, and without an overly long shift duration, then that ratio could be selected as the target transmission ratio corresponding with oncoming clutch fuse pressure. If the shift is not successful, then another trial may be made wherein clutch pressure is increased until a relatively smaller transmission input/output ratio is reached. Through a series of trials, one may arrive upon a target transmission ratio that indicates an acceptable clutch pressure has been reached, as well as acceptable shift quality.

Rather than the empirical approach described above, utilizing test machines, a computer modeling approach might be used to determine the subject transmission ratio values. Further, it should be appreciated that each individual work machine might be tuned to provide desired shift characteristics, by adjusting the predetermined transmission ratio, or ramp rate via the first curve segment.

The present disclosure further provides control logic for shifting gears in a work machine. To this end, electronic controller 20 may include an article having a computer readable medium such as RAM, ROM or another suitable medium with a control algorithm recorded thereon. The control algorithm may be a shifting control algorithm including means for modulating an oncoming clutch pressure versus time via the first segment of the predetermined curve, and modulating the oncoming clutch pressure versus time via the second segment of the predetermined curve after the occurrence of the predetermined transmission state.

The control algorithm may further include means for determining the occurrence of the predetermined relative velocity state at least in part by determining a ratio of a transmission input speed to a transmission output speed. The control algorithm may further include means for selecting the slope of at least the first segment of the predetermined curve from among a plurality of predetermined first segment slopes mapped to work machine output torque.

While it is contemplated that the shift may be carried out via software control logic, those skilled in the art will appreciate that, rather than relying solely upon software, certain of the aspects of shifting might instead be implemented via dedicated hardware that emulates one or more of the software based control functions described herein.

INDUSTRIAL APPLICABILITY

Figure 4:
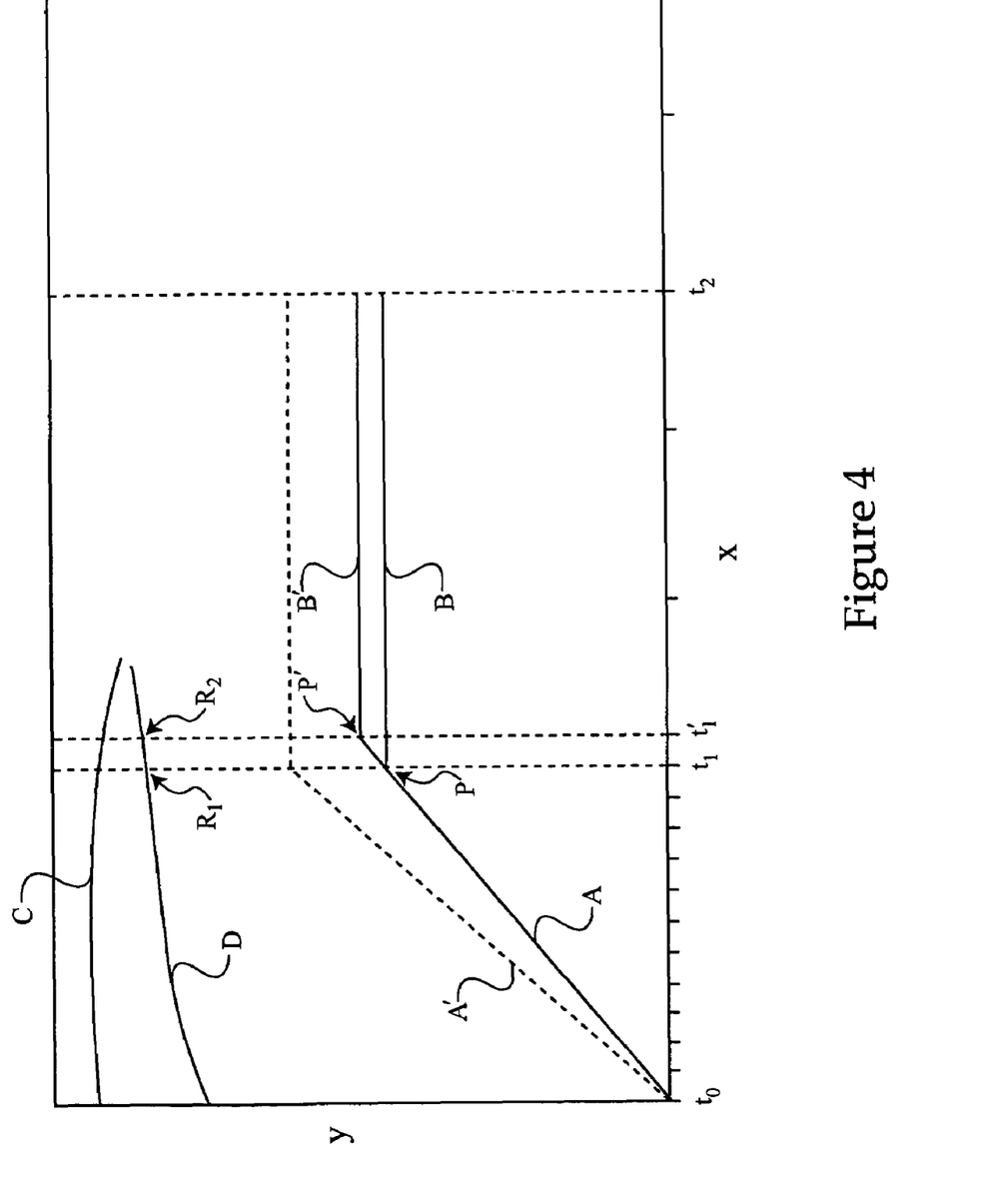
FIG. 4 is a graph illustrating certain aspects of a gear shifting process according to the present disclosure.

Turning now to FIG. 4, there are shown certain aspects of a typical gear shifting event according to the present disclosure by way of a graph. In FIG. 4, the X axis represents time, whereas the Y axis represents relative quantities as compared with the respective illustrated parameters, as described herein. Line A represents the first segment of the predetermined clutch pressure curve, whereas lines B and B' represent the second segment of the predetermined clutch pressure curve. Line A' represents a first curve segment, having a relatively steeper net slope than Line A, for example, a first curve segment wherein work machine 10 is in a loaded condition, and oncoming clutch pressure is to be increased relatively rapidly. Lines C and D represent the transmission input speed and transmission output speed, respectively, as they might appear during a typical upshift process. $R_1$ and $R_2$ represent predetermined transmission shift ratios or predetermined relative velocity transmission "states," for example, for unloaded and loaded conditions respectively, as described herein. Points P and P' represent transition points between the first and second segments of the predetermined curve for different work machines. Finally, time $t_0$ represents a time of shift detection, time $t_1$ represents one transition time between first segment A and second segment B, for example for an unloaded condition of work machine 10. Time $t_1'$ represents another possible transition time between first segment A and second B', for example for a loaded condition of work machine 10, and time $t_2$ represents the time of clutch ring-in.

Figure 3:
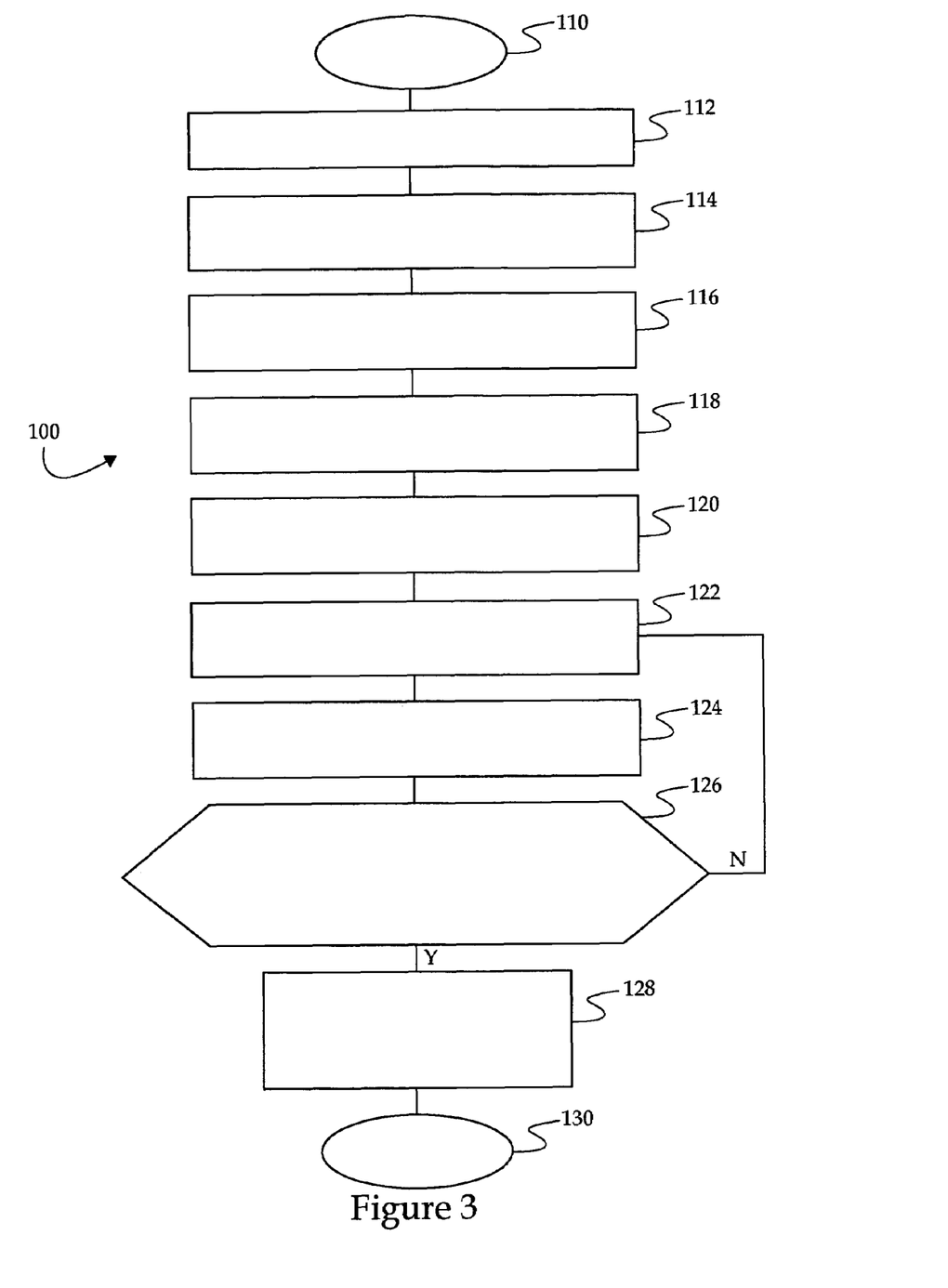
FIG. 3 illustrates an exemplary gear shifting process according to the present disclosure.

Referring also to FIG. 3, there is illustrated an exemplary control process according to the present disclosure by way of a flowchart 100. The process of flowchart 100 will begin at a START, Box 110, and thenceforth proceed to Box 112 wherein a shift command from the operator or electronic controller 20 will be determined, corresponding to time $t_0$ of FIG. 4. From Box 112, the process may proceed to Box 114 wherein electronic controller 20 may determine a load condition of work machine 10. The load condition may be determined, for example, by measuring engine broadcast torque. It should be appreciated that while in the embodiment described herein two load conditions, loaded or unloaded, may be determined, the present disclosure is not thereby limited and there could be any number of load conditions of the work machine, each dictating a separate shifting strategy by way of different predetermined transmission shifting ratios, different applicable curve segments, etc.

From Box 114 the process may proceed to Box 116 wherein electronic controller 20 will set the first curve segment ramp rate or slope that corresponds with the determined load condition of work machine 10. From Box 116 the process may proceed to Box 118 wherein electronic controller 20 will initiate decreasing of the offgoing clutch pressure, for example, the first clutch 32. From Box 118 the process may proceed to Box 120 wherein electronic controller 20 may initiate increasing oncoming clutch pressure via the first segment of the predetermined curve, segment A in FIG. 4 for example. Those skilled in the art will appreciate that the actual timing of initiation of decreasing of the offgoing clutch pressure and increasing of the oncoming clutch pressure need not take place in the sequence described herein, and increasing of the oncoming clutch pressure might actually begin prior to decreasing of the offgoing clutch pressure. Moreover, different first curve segments may be used, depending on load condition, but need not be.

From Box 120 the process may proceed to Box 122 wherein electronic controller 20 may determine the transmission input speed, for example via sensor 24. From Box 122 the process may proceed to Box 124 wherein electronic controller 20 may determine the transmission output speed. Again, those skilled in the art will appreciate that the steps of determining the transmission input and output speeds need not take place in a particular sequence, and might even take place in parallel.

From Box 124 the process may proceed to Box 126 wherein electronic controller 20 may query whether the transmission input speed to output speed ratio has reached the predetermined ratio. $R_1$ and $R_2$ in FIG. 4 represent different ratios which might be used for different work machines. If no, the process may return to Box 122 wherein the steps to determine the occurrence of the transmission ratio will be repeated. Where the transmission ratio has reached the predetermined ratio, point P or P' in FIG. 4, the process may proceed to Box 128 wherein electronic controller 20 will modulate the oncoming clutch pressure via the second predetermined curve, curve B or B' in FIG. 4. At P/P' engine torque may again be determined, to be used as a basis for the second curve segment slope or other characteristics if desired. From Box 128 the process may proceed to Box 130, a FINISH.

The present disclosure thus provides a method of shifting gears whereby a transition from the dynamic to static coefficient of friction as the oncoming clutch engages may be carried out without increasing clutch pressure. That is, the oncoming clutch pressure may be increased up to a fuse pressure, and maintained at that pressure until clutch ring-in. As described herein, clutch pressure modulation via the second curve segment may be varied to accommodate torque changes induced intentionally or unintentionally by the operator. Not only may the shift duration be relatively short by implementing the present strategy, it can take place without undue acceleration or jerk. Moreover, the strategy provides means for compensating for different load conditions of the work machine by adjusting ramp rate, as described herein.

The present description is for illustrative purposes only, and should not be construed to narrow the breadth of the present disclosure in any fashion. Thus, those skilled in the art will appreciate that various modifications might be made to the presently disclosed embodiments without departing from the intended spirit and scope of the present disclosure. For example, while the present disclosure is described primarily in the context of a work machine having an automatic transmission, it is not thereby limited. Manual transmission work machines might similarly benefit through application of the present disclosure. In such a system, rather than clutches being automatically controlled, they might be partially operator controlled, with the respective increase in oncoming clutch pressure controlled according to the predetermined curve segments described herein via electronically controlled clutch actuators. Still further, although the presently described shifting strategy is discussed primarily in the context of varying the shifting strategy for loaded versus unloaded conditions of a work machine, it is not thereby limited and a single strategy might be implemented in a work machine regardless of load condition without departing from the scope of the present disclosure. In other words, rather than selecting a first curve segment based on a load condition of work machine 10, in certain systems a single curve segment might suffice for all load conditions such a work machine is likely to encounter. Other aspects, features and advantages will be apparent upon an examination of the attached drawings Figures and appended claims.

What is claimed is:

1. A method of shifting gears in a transmission of a machine comprising the steps of:
    modulating an oncoming clutch pressure versus time during a requested shift at a first predetermined rate of change;
    determining a value indicative of a transmission input to output speed ratio; and
    modulating the oncoming clutch pressure versus time during the requested shift at a second predetermined rate of change different from the first predetermined rate of change, prior to oncoming clutch ring-in, and based at least in part on the determined value.

2. The method of claim 1 wherein the determining step comprises the step of determining the occurrence of a predetermined transmission input speed to output speed ratio, the method further comprising the step of transitioning modulation of the oncoming clutch pressure from the first predetermined rate of change to the second predetermined rate of change after the occurrence of the predetermined transmission input speed to output speed ratio.

3. The method of claim 2 wherein the step of modulating the oncoming clutch pressure at the first predetermined rate of change comprises increasing the oncoming clutch pressure at a predetermined linear rate.

4. The method of claim 3 wherein:
    the step of modulating the oncoming clutch pressure at the first predetermined rate of change comprises increasing the oncoming clutch pressure toward a fuse pressure that is based at least in part on a machine torque; and
    the step of determining the occurrence of a predetermined transmission input speed to output speed ratio comprises determining the occurrence of the oncoming clutch fuse pressure.

5. The method of claim 4 wherein the step of modulating the oncoming clutch pressure at the second predetermined rate of change comprises holding the oncoming clutch pressure constant versus time such that the second predetermined rate of change is about zero.

6. The method of claim 4 wherein the step of determining the occurrence of the predetermined transmission input speed to output speed ratio comprises determining the occurrence of different oncoming clutch fuse pressures for different load conditions of the machine.

7. The method of claim 4 wherein the step of modulating the oncoming clutch pressure at the first predetermined rate of change comprises increasing the oncoming clutch pressure toward a relatively higher fuse pressure for a relatively higher load condition of the machine, and increasing the oncoming clutch pressure toward a relatively lower fuse pressure for a relatively lower load condition of the machine.

8. The method of claim 7 wherein the step of modulating the oncoming clutch pressure at the first predetermined rate of change comprises modulating the oncoming clutch pressure at a relatively steeper rate where machine torque is relatively greater, and at a relatively less steeply rate where the torque is relatively lesser.

9. The method of claim 8 wherein:
the machine comprises a multi-mass vehicle including an automatic transmission; and
each of the modulating steps comprises modulating the oncoming clutch pressure at least in part by adjusting a hydraulic pressure of an oncoming clutch actuator with an electronic controller coupled with a hydraulic system of the machine.

10. The method of claim 9 wherein:
the step of modulating the oncoming clutch pressure at the first predetermined rate of change comprises modulating the oncoming clutch pressure at a high rate of change; and
the step of modulating the oncoming clutch pressure via the second predetermined rate of change comprises modulating the oncoming clutch pressure at a low rate of change relative to the high rate of change.

11. A machine comprising:
a machine body;
a transmission coupled with said machine body and having at least two gears; and
an electronic controller coupled with said transmission and operable to control an oncoming clutch pressure thereof, said electronic controller including means for modulating an oncoming clutch pressure versus time at a first predetermined rate of change, and means for modulating the oncoming clutch pressure versus time at a second predetermined rate of change different from the first predetermined rate of change prior to oncoming clutch ring-in, and after the occurrence of a predetermined relative velocity state of the transmission.

12. The machine of claim 11 wherein said electronic controller further includes means for determining the occurrence of the predetermined relative velocity state at least in part by determining a transmission input speed to output speed ratio.

13. The machine of claim 12 wherein a slope of the first predetermined rate of change is positive and linear.

14. The machine of claim 13 wherein the second predetermined rate of change is about zero.

15. The machine of claim 13 wherein said electronic controller further includes means for determining a machine output torque, and means for selecting the first predetermined rate of change from among a plurality of predetermined rates of change mapped to output torque.

16. An electronic controller comprising means for controlling oncoming clutch pressure prior to clutch ring-in during a gear shift in a machine, including means for modulating oncoming clutch pressure versus time at a first predetermined rate of change, and means for modulating the oncoming clutch pressure versus time at a second and different predetermined rate of change, after the occurrence of predetermined transmission input speed to output speed ratio of the machine.

17. The electronic controller of claim 16 further comprising means for determining first predetermined rate of change from a plurality of rates of change based at least in part on a machine output torque.

18. The electronic controller of claim 17 wherein said means for modulating oncoming clutch pressure at the first predetermined rate of change includes means for linearly increasing oncoming clutch pressure toward a fuse pressure indicated by the occurrence of the predetermined transmission input speed to output speed ratio.

19. The method of claim 1 wherein the second predetermined rate of change is about zero.

20. The machine of claim 11 wherein the second predetermined rate of change is about zero.

* * * * *

UNITED STATES PATENT AND TRADEMARK OFFICE
CERTIFICATE OF CORRECTION

PATENT NO. : 7,353,725 B2  
APPLICATION NO. : 11/269947  
DATED : April 8, 2008  
INVENTOR(S) : Kabrich et al.

Page 1 of 1

It is certified that error appears in the above-identified patent and that said Letters Patent is hereby corrected as shown below:

Please correct the Inventor as follows:
Title page, item (75), in Column 1, Line 2, delete "Tom Brosowke" and insert
-- Tom Brosowske --.

Please correct the References Cited as follows:
Title page, item (56), under "U.S. Patent Documents", in Column 2, Line 8, below "7,225,907 B2* 6/2007 Katou et al. …….. 192/3.26"
insert -- 2006/0219509 A1 * 10/2006 Kabrich et al. ………. 192/003.63 --.

Please correct the Specification as follows:
Column 2, line 42, after "oncoming" delete ",".

Signed and Sealed this

Eleventh Day of November, 2008

JON W. DUDAS  
*Director of the United States Patent and Trademark Office*